Aug. 18, 1964 E. J. SHEELY 3,144,770
MEANS FOR DETERMINING AN INTERNAL CONDITION
IN ELECTRICAL APPARATUS
Filed Jan. 30, 1961 4 Sheets-Sheet 2

Inventor,
Edward J. Sheely,
by Gilbert P. Tarleton
His Attorney.

Aug. 18, 1964  E. J. SHEELY  3,144,770
MEANS FOR DETERMINING AN INTERNAL CONDITION
IN ELECTRICAL APPARATUS
Filed Jan. 30, 1961  4 Sheets-Sheet 3

Inventor,
Edward J. Sheely,
by Gilbert P. Tarleton
His Attorney.

United States Patent Office 3,144,770
Patented Aug. 18, 1964

3,144,770
MEANS FOR DETERMINING AN INTERNAL
CONDITION IN ELECTRICAL APPARATUS
Edward J. Sheely, Pittsfield, Mass., assignor to General
Electric Company, a corporation of New York
Filed Jan. 30, 1961, Ser. No. 85,618
17 Claims. (Cl. 73—350)

This invention relates to means for electrically determining an internal condition in electrical apparatus, and more in particular to devices for detecting the temperature of an electrical conductor by means of a current that is proportional to current in the conductor.

Electrical conductors generate heat in proportion to the amount of current that they carry. This provides a convenient basis for measuring the temperature of apparatus composed of such conductors. However, difficulties have been encountered when the temperature indicating means is of the type actuated by a current proportional to the current in electrical translating apparatus that produces a strong magnetic field when in operation. For example, in electrical induction apparatus, such as liquid-cooled transformers and the like, it is often necessary to obtain an accurate indication of the temperature of the transformer windings in order to insure that insulation on the windings is not harmed by excessive temperature rises. Since the temperature of the windings will be highest in the portions carrying the greatest current, temperature detecting devices are often connected to a current transformer disposed around a bushing for the low voltage (i.e. high current) winding. One prior art practice has been to connect an electrically actuated temperature detecting device to a lead from the current transformer and ground the device to a wall of the liquid-filled metallic enclosure tank containing the transformer. This arrangement provides the temperature detecting device with a current proportional to the current in the transformer. It is also necessary for the temperature detecting device to reflect the temperature of the cooling liquid, so the device must be at least partially on the inside of the enclosure tank below the liquid level. A resistor connected to the current transformer in parallel with the temperature detecting device is generally required for calibrating the device by shunting excess current produced by the current transformer. The shunting resistor should be mounted on the exterior of the enclosure tank to provide easy access thereto. The shunting resistor is also grounded by connecting it to the metallic enclosure tank wall. The temperature detecting device and shunting resistor are grounded at different locations on the tank wall. The reason for this is that it is impractical and expensive to maintain a liquid-tight seal when the above-mentioned elements are grounded to the same point because the temperature detecting device extends into the liquid in the tank while the resistor is on the outside of the tank.

Problems have arisen in obtaining accurate readings from temperature detecting devices connected in the manner described in the preceding paragraph. Furthermore, when two or more temperature detecting devices were connected to the same current transformer in the manner described above, it has been extremely difficult to obtain the same temperature reading from the respective temperature detecting devices.

I have discovered that the above difficulties are caused by stray magnetic flux produced by the current in the conductor whose temperature is being measured. For example, in power transformers having a power carrying capacity of above approximately 10,000 kva., the lead connecting the low voltage winding to the low voltage bushing carries a relative large current and is thus surrounded by a strong magnetic field. Much of the stray flux from the magnetic field permeates the metallic enclosure tank containing the windings. The electric circuit in which the temperature detecting device is connected provides a closed loop conducting path through the enclosure tank, and the closed loop is linked by the stray flux concentrated in the tank wall. The current generated in the temperature detecting device circuit by the linked stray flux will either oppose the proportional current from the current transformer or will add to the proportional current, depending on where the temperature detecting device is connected to the current transformer. Thus the current received by the temperature detecting device will be different from the proportional current it is adjusted to receive. This results in inaccurate readings on temperature indicating mechanisms actuated by the temperature detecting device. The currents produced by the stray flux result in widely inconsistent readings even when two indicating devices adjacent each other on the tank wall are connected to the same current transformer. The reason is that the current produced by the stray flux will add to the current received by one device, but will oppose the current received by the other device.

One possible solution to the above problem is to use a non-magnetic insert in the enclosure tank wall for attaching the resistors and temperature detecting devices, and then grounding the devices to the same point on the tank wall by means of leads. This arrangement has been found unsatisfactory, however, because corrosion and sealing problems arise when the insert is a non-magnetic metal different from that used for the enclosure tank. The use of a non-metallic insert, such as plastic, is also unsatisfactory because a weak area is produced in the tank structure. Furthermore, the use of such relatively expensive non-magnetic materials increases the cost of the apparatus.

Accordingly, it is an object of my invention to provide means for electrically ascertaining an internal operating condition of flux producing electrical apparatus, and means for insuring that stray flux from the apparatus, does not cause significant errors in the condition ascertaining means.

Another object of my invention is to provide improved means for electrically detecting the temperature of an electric conductor.

Another object of my invention is to provide an arrangement for electrically detecting the temperature of a conductor in which stray flux from the conductor does not prevent accurate calibration of the detecting means.

A further object of the invention is to provide an integral temperature detecting assembly that is economical and compact, and is made from standardized parts.

A still further object of the invention is to provide a standardized temperature detecting assembly that is usable for electrical apparatus over a wide range of sizes.

Another object of my invention is to provide a temperature detecting assembly that enables different sized electrical apparatus to which it is attached to be partially standardized.

A further object of the invention is to provide an improved electrical apparatus having an accurate temperature detecting device for determining the temperature of a conductor in the apparatus.

Other objects and advantages of the invention will become apparent from the specification, drawing, and claims, and the scope of the invention will be pointed out in the claims.

Briefly stated, according to a broad aspect of my invention, electrical apparatus that produces a strong magnetic field when in operation may be provided with electrically operable means for ascertaining an internal operating condition of the apparatus. When the condition ascertaining means includes a closed loop electric circuit that is linked by flux from the magnetic field, means may be provided for orienting the relation of the loop to the field so as to reduce the flux linked by the loop circuit to a predetermined amount that does not cause significant inaccuracies in the condition ascertaining means.

A more specific aspect of my invention is characterized by means for electrically determining the temperature of a current-carrying conductor contained in an enclosure made of magnetic conducting material. The accuracy of the temperature determining means is improved by eliminating the effect of stray magnetic flux caused by the current in the conductor. This can be accomplished even when means such as a current transformer for providing a current proportional to the current in the conductor is employed. Temperature detecting means such as a heater coil may be electrically connected to the means providing proportional current. Resistance means may be connected to the means providing proportional current in shunt with the temperature detecting means. When temperature detecting means and the shunt resistance means are grounded to the enclosure, a closed loop conducting path that links stray flux is formed. The essence of this aspect of the invention is reducing the distance on the metallic enclosure between the ground for the temperature detecting means and the ground for the shunt resistance means to a dimension at which the stray flux from the current-carrying conductor will not induce a sufficiently larger current in the loop circuit to prevent accurate calibration of the detecting means.

Figure 1:
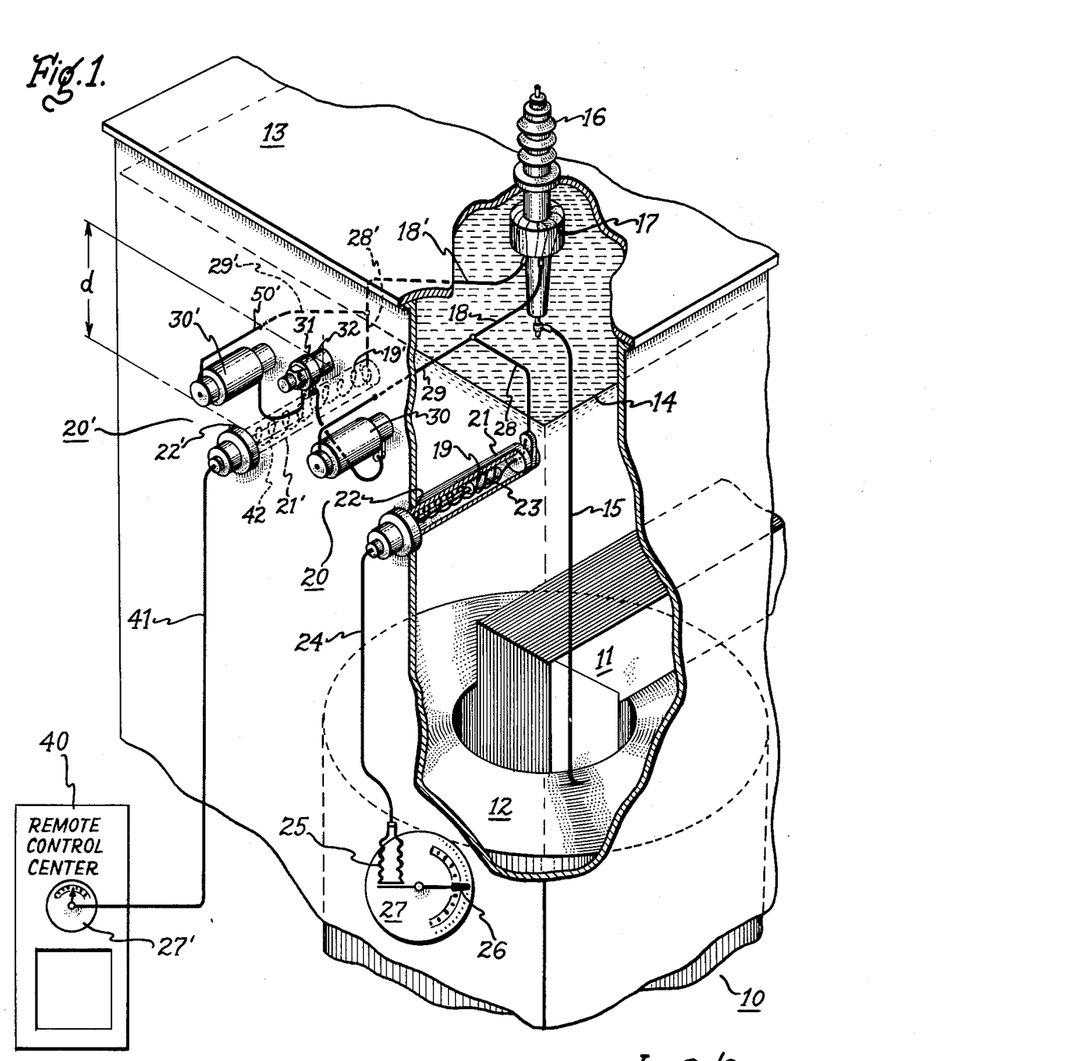
FIG. 1 is an isometric, partly broken away, schematic view of one embodiment of apparatus in accord with the teachings of my invention.

The invention will now be explained by reference to the drawing. In FIG. 1, an electrical power transformer 10 is shown to comprise a core 11 and winding 12 contained in a metallic enclosure tank 13. The metal from which the tank 13 is made is customarily a weldable plate steel that has a relatively high magnetic permeability when compared to air; the tank steel is also capable of conducting electric current. The tank 13 may contain a dielectric liquid 14 for insulating and cooling purposes, and a lead 15 from a low voltage coil of the winding 12 may be connected to a low voltage bushing 16 according to conventional practice.

In transformers of the type illustrated having a power capacity above about 10,000 kva., it is usually necessary to maintain an accurate indication of the temperature of the winding 12 in order to insure that the temperature of the winding does not rise above a predetermined safe value at which electrical insulation will deteriorate or break down. Since the temperature of the winding 12 is a function of the electric current flowing through the winding, one prior art practice has been to employ the central conductor passing through the low voltage bushing 16 or the lead 15 as the primary winding of a current transformer. The secondary winding of the current transformer may be a winding coil 17 surrounding the lower end of the bushing 16 as shown in FIG. 1. Leads 18 and 18' from the current transformer secondary 17 can therefore be employed to provide current proportional to the current in the winding 12 to identical temperature detecting devices 20 and 20'.

For the purpose of simplification, the temperature detecting device 20 will now be described, but is to be understood that correspondingly numbered parts designated by a prime (') in the device 20' are identical in structure and function to those in the device 20. The device 20 may comprise a current responsive element, such as a heater coil 19, electrically connected to the lead 18 by a lead 28. The coil 19 may be housed in a well 21. The well 21 extends through an opening in a wall of the tank 13 below the level of the liquid 14 so as to be immersed in the liquid 14. This insures that the well 21 is in heat transfer relationship with the cooling medium for the winding 12. The heater coil 19 is grounded at 22 to the wall of the metallic enclosure tank 13 for reasons explained in paragraphs that follow. In order to accurately calibrate the current responsive heater coil 19, it is generally necessary to employ calibrating resistance means 30 connected to the current transformer lead 18 by a lead 29 that is insulated from the tank 13. The resistance means 30 is connected in parallel with the coil 19 in order to shunt excess current produced by the current transformer 17. To obtain the proper shunt relationship, one end of the resistance 30 is also grounded to the wall of the metallic enclosure tank 13 at a point 32 by means of a ground stud 31.

The temperature detecting device 20 also comprises means for providing a response to temperature changes in the winding 12. The means providing a response to winding temperature changes must be of such a nature that it is responsive to the current actuated element connected to the means providing a proportional current. In the illustrated embodiment, the current actuated element is the heater coil 19, so the response producing means must be responsive to the heat generated by the coil 19. The means providing a response to winding temperature changes has been illustrated as a dial and pointer for providing a visible indication of the winding temperature. However, it will be appreciated by those skilled in the art that other known arrangements, such as signal lights, audible alarms, or electric relays that shut off the apparatus, could also be employed without departing from the spirit or scope of the invention.

One well known arrangement for providing visible indication of temperature is to employ a fluid containing bulb 23 located in the well 21 so as to be in heat transfer relationship with the coil 19 and the liquid 14. The bulb 23 is connected by means of a capillary tube 24 to an expandable bellows 25, thus defining a sealed fluid system. The fluid in the bulb 23 will be caused to expand or contract by temperature changes in the well 21. This will cause the bellows 25 to expand or contract. The bellows may be associated with a pivoted pointer 26 so that the pointer moves along a dial 27 that provides a visible indication of the temperature of the winding 12.

Temperature changes in the well 21 will be caused by the heat from the coil 19 and the heat from the liquid 14. Sudden temperature rises caused by current surges in the winding 12 will be indicated by the pointer 26 even though the fluid 14 has not yet been heated to the same temperature as the winding 12 because the coil 19 produces heat independently of the liquid 14. Thus the pointer 26 will indicate the hottest location in the enclosure 13. Temperature indicating means employing a sealed fluid system of the type illustrated provides a convenient arrangement for indicating temperature locally of the apparatus. The details of the illustrated temperature indicating means are intended to be symbolic only, and form no part of the present invention because they are well known to the prior art.

It is often desirable to provide a response to the temperature changes of a transformer winding at a location remote from the apparatus. One common arrangement is to have a control center, indicated diagrammatically at 40 in FIG. 1, for controlling several transformer installations. The control center may be located a significant distance away from the transformers, so it should have its own winding temperature indicating dial 27' in addition to the local temperature indicating dial 27 on the transformer itself. The indicating dial 27' in the remote control center 40 may be electrically connected to a temperature detecting device 20' identical to the device 20, except that the dial 27' and its pointer may be actuated by an electrical impulse proportional to the temperature winding 12. The proportional impulse may be provided through a lead 41 by means of a resistor 42 in the well 21'. The resistor 42 is the type in which resistance varies with temperature, so the electrical impulse that reaches the indicating means 27' will vary with the temperature of the liquid 14 or heat produced by the coil 19'. It is to be understood that the specific structure of the means providing a visible indication of temperature at the remote control center 40 forms no part of the present invention because these arrangements are well known in the art. Consequently, the illustration of these elements and the description thereof is also intended to be symbolic.

In the temperature detecting device 20', the heater coil 19' is connected to the lead 18' from the current transformer 17 by a lead 28', and associated with the resistance means 20' in the identical manner as the heater coil 19 is connected to corresponding elements in the device 20. It is obviously necessary that the remote temperature indicating dial 27' and the local temperature indicating dial 27 and their associated elements be calibrated so that they provide a reading within one or two degrees of each other in order to insure accurate control of the transformer. It is also obvious that the readings from both temperature indicating means must accurately indicate the temperature of the winding 12.

Difficulty has been encountered in calibrating temperature detecting devices, such as 20 and 20', so that temperature indicating dials 27 and 27' have the same reading; also the readings on any single dial do not always accurately indicate the temperature of a winding. I have discovered that the reason for these difficulties is that stray magnetic flux from the lead 15 and bushing 16 is concentrated in the tank 13, and the flux in the tank links loop circuits defined by the elements comprising the respective devices 20 and 20'. This causes loop currents to flow in the loop circuit of each temperature detecting device. The loop currents oppose the current from the current transformer in one loop circuit, and the loop currents add to the current of the current transformer in the other loop circuit. The above-described condition can be better understood by reference to the circuit diagram of FIG. 2.

Figure 2:
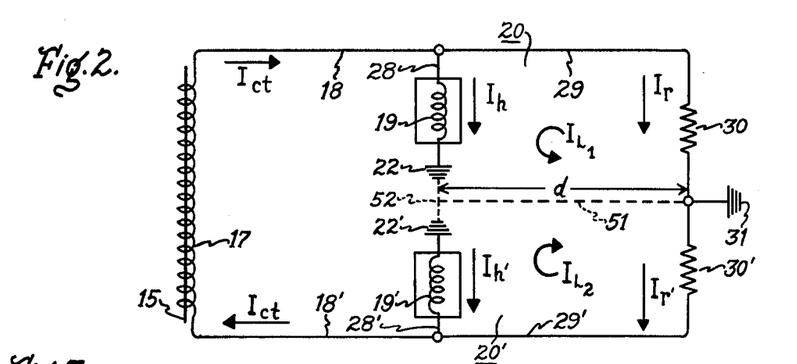
FIG. 2 is a circuit diagram for the temperature detecting means shown in FIG. 1.

Referring now to FIG. 2, it will be apparent that in order for the remote and local indicating means to have the same readings, the respective temperature detecting devices 20 and 20' must be connected in series in the current transformer circuit so that they will both receive the same total quantity of current from the winding 17. Since the standardized commonly-employed heater wells 21 and 21' have one end of their respective heater coils 19 and 19' grounded to the tank wall, the assemblies must necessarily be connected to opposite ends of the current transformer secondary winding 17 in order to achieve a series circuit arrangement. This insures that the heater coils 19 and 19', in the respective temperature detecting devices 20 and 20', along with their associated shunt resistors 30 and 30' will receive the same quantity of current, $I_{ct}$, from the secondary winding 17. The quantity of current flowing through each heater coil 19 and 19' may be adjusted by employing the proper value of shunt resistance. This circuit connection can be accomplished when the heating coils 19 and 19' and their associated shunting resistors 30 and 30' are, respectively, connected to leads 18 and 18' from opposite ends of the winding 17. This circuit also results in the respective calibrating resistances 30 and 30' having no effect on the current flowing through the heater coil that they are not in parallel with.

This circuit arrangement results in two closed loops of conducting material. The first loop is defined by heater coil 19 which is grounded at 22, the calibrating resistance 30 which is grounded at 31, the leads 28 and 29 which connect the coil 19 and resistance 30 to the lead 18, and the portion of the metallic tank wall between the ground connections. The second loop is defined by the heater coil 19' which is grounded at 22', the calibrating resistance 30' which is grounded at 31, the leads 28' and 29' which connect coil 19' and resistance 30' to 18', and the portion of the tank wall between the ground connections. As will be apparent to those skilled in the art, the ground 22 for the heater coil 19, the ground 22' for the heater coil 19' and the common ground 31 for the resistances 30 and 30' can all be connected together, as indicated by the dotted line 51 and 52, without affecting their relationship in the respective loop circuits. Thus, the length of the connection line 51 represents the conducting path through the wall of the tank 13 between the heater coil grounds 22 and 22' and the resistor ground 31. The vertical length of the conducting path through the tank wall has been designated the distance $d$ in the drawing. The distance $d$ is intended to represent the distance between conductors in the loop circuits measured in a direction substantially perpendicular to the direction flux is travelling in the tank wall.

Figure 3:
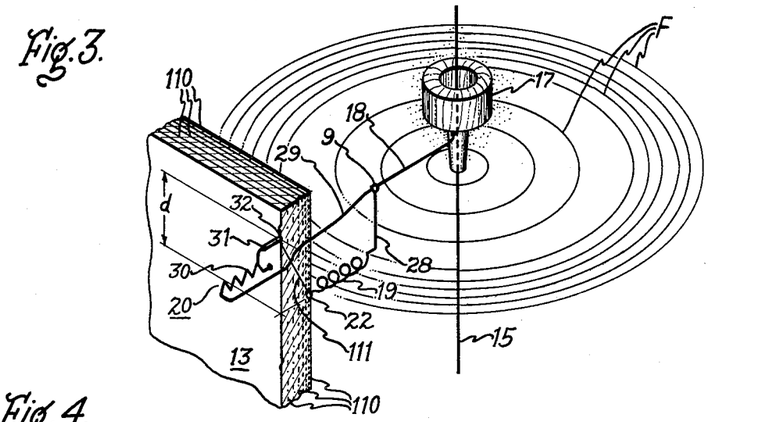
FIG. 3 is an isometric, partially broken away, schematic view of the apparatus shown in FIG. 1, showing some parts on an exaggerated scale and showing the stray magnetic field.

The manner in which the elements in the temperature detecting device form a closed conducting loop circuit that is linked by flux from the lead can better be understood by reference to FIG. 3, wherein a portion of the tank wall 13 and circuit elements comprising the temperature detecting device 20 in FIG. 1 are indicated schematically. It will be assumed for the purposes of simplification that the lead 15 from a current-carrying winding is parallel to the metallic enclosure tank 13. Since the tank 13 is a magnetic steel, its permeability is very much greater than that of the adjacent fluids. In such a case, the stray flux F will tend to be highly concentrated in the tank wall as indicated schematically by the flux lines 110. It should be noted that the flux tends to concentrate adjacent the inside surface of the tank wall because flux will follow the path of least resistance; thus the flux will not travel any farther radially outwardly of the lead 15 than is necessary to find a high permeability path.

Starting at the point 9 in FIG. 3 and proceeding away from the current transformer 17, the loop circuit defined by the elements comprising the device 20 is formed by the lead 29, through the resistor 30, then through the connection between the resistor 30 and the ground stud 31 through the ground stud 31 to the point 32, then through the tank wall along the conducting path 111 to the point 22, then through the heater element 19, and finally through the lead 28 back to the point 9. Thus these circuit elements form a closed conducting path, and part of the path lies in a plane perpendicular to the flux in the tank 13. Consequently, flux in the tank 13 will link the closed conducting path, and will thus cause loop current to flow between the elements of the device 20. Substantially all of the flux linked by the closed loop is in the tank wall because the permeability of the tank 13 is very high with respect to the atmosphere and the fluid on the inside of the tank 13. Thus, the critical factor in determining the magnitude of the current in the loop circuit is the amount of flux permeated tank material between conductors passing through the tank wall. The portion of the tank wall defining the conducting path 111 can be considered a conductor passing through the tank wall because this is the means by which current gets from ground point 32 to the other ground point 22.

Thus, in the arrangement illustrated in FIG. 3, the distance $d$ that vertically spaces the points 32 and 22, where the respective resistor and heater elements are grounded, is the critical variable that determines how much flux is within the closed conducting path. As this distance varies, so also will vary the amount of undesirable loop current produced in the loop circuit. Although the circuit elements comprising the temperature detecting device 20 have been illustrated in FIG. 3, it is to be understood that an identical loop circuit is defined by the indicating device 20'.

Referring again to FIG. 2, the total current $I_{ct}$ from the current transformer 17 will flow through the lead 18 toward the coil 19, and the total current $I_{ct}$ will also flow through the lead 18' away from the coil 19'. Thus, the current $I_{ct}$ will divide into two components in each of the loop circuits. In the first closed loop the current components will be $I_h$ flowing through the heater coil 19, and $I_r$ flowing through the calibrating resistance 30. In the second closed loop the components will be $I_h'$ flowing through the coil 19' and $I_r$, flowing through the resistance 30'. It is obvious that $I_h + I_r = I_h' + I_r'$, since the same total current ($I_{ct}$) is supplied to both loops by the current transformer winding 17.

Referring still to FIG. 2, a loop current $I_{L_1}$ will flow in the first loop because a closed path of conducting material is provided for linking the stray flux from the high current lead 15. The same conditions exist with regard to the second loop wherein a loop current $I_{L_2}$ will be induced by stray flux linking a closed path of conducting material. The orientation of the elements defining the first and second loop circuits with respect to the direction of travel of the stray flux causes the loop currents of the first and second loop circuits to flow in the same direction through the tank wall. In other words, the loop currents $I_{L_1}$ and $I_{L_2}$ will both flow toward the common ground 31, or both loop currents will flow away from the common ground 31. For the purpose of illustration, the loop currents $I_{L_1}$ and $I_{L_2}$ have both been illustrated as flowing through the conducting path 51 in the tank wall toward the common ground 31, although those skilled in the art will realize that both loop currents may flow in the opposite direction, depending on the direction that the stray flux travels.

It is therefore apparent from FIG. 2, that the loop current $I_{L1}$ will oppose the current $I_r$ and add to the current $I_h$ in the first loop, and that the loop current $I_{L_2}$ will add to the current $I_r'$ and oppose the current $I_h'$ in the second loop. Thus, for any given condition of current in the lead 15 with which the current transformer winding 17 is coupled, the heater coils 19 and 19' will not necessarily receive the same net currents. Thus, the coils 19 and 19' will not produce the same amount of heat for actuating temperature responsive elements in the indicating means that they actuate. This results in inaccurate readings on the temperature indicating dials 27 and 27', and prevents accurate calibration of the devices with respect to each other. As a practical matter, the result has been that the remote and local temperature indicating mechanisms have shown variations in temperature readings by as much as 10° C., even though they were both connected to leads from the same current transformer that provided them both with identically the same total current. The temperature indicating means had, of course, been previously accurately calibrated in known temperature environments.

I have discovered that by far the greatest portion of the loop currents $I_{L1}$ and $I_{L2}$ is induced by stray flux concentrating in the tank wall in the area between the common ground 31 and the grounds 22 and 22'. The reason for this is that transformer enclosure tanks are made from magnetic materials such as steel. These magnetic materials have a permeability for magnetic flux that is many thousand of times greater than the permeability of the atmosphere and the dielectric fluid in the tank. This means that the stray flux will be highly concentrated in the tank wall. Thus, the magnitude of the loop currents $I_{L_1}$ and $I_{L_2}$ will be a function of the amount of flux permeated metal in the tank wall that is linked by the loop circuits. In the embodiments of FIGS. 1-3 the flux linked by the loop circuit will be the flux traveling in the tank wall between the points 22 and 32 where the heater coil and resistor are grounded. Thus, by reducing the distance along the tank wall between the grounds, the amount of flux-permeated metal in the loop circuits will be reduced. This will result in a reduction in the magnitude of the loop currents $I_{L_1}$ and $I_{L_2}$. I have found that when the distance between grounds is reduced to certain predetermined values, the influence of the stray flux in producing the loop currents will be reduced to a point where the loop currents do not prevent accurate calibration of the temperature detecting means 20 and 20'.

It is the usual practice to have the enclosure tank for electrical transformers grounded to the earth. However, it will be appreciated by those skilled in the art that the tank 13 need not actually be at ground potential for the above described conditions and operations to take place. In other words, condition ascertaining means such as the temperature detecting devices discribed above will operate in the circuit arrangements described, and loop currents will be induced therein whenever both the heater coil and the calibrating resistance means are electrically connected to an enclosure that provides a conducting path between them even though the enclosure is not at ground potential. Consequently, the term "grounded," as used in the specification and claims, is intended to mean that an element is electrically connected to the apparatus enclosure, but that the enclosure may or may not be at ground potential.

Figure 4:
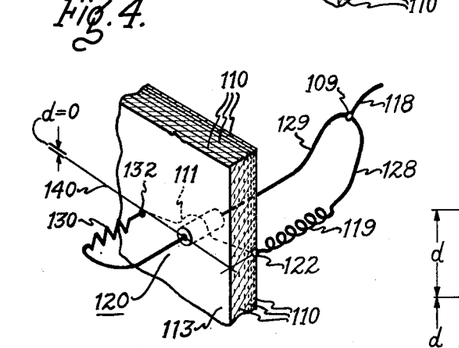
FIG. 4 is an isometric, partially cross-sectional, schematic view of another embodiment of my invention.
Figure 5:
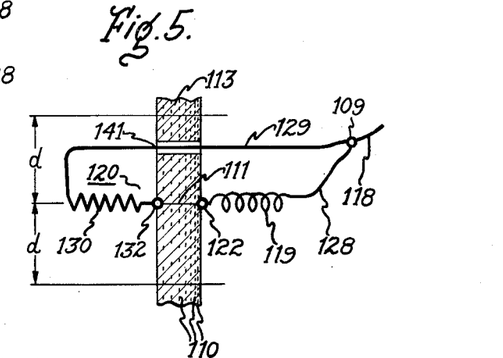
FIG. 5 is a schematic, cross-sectional view of a further embodiment of the invention.
Figure 6:
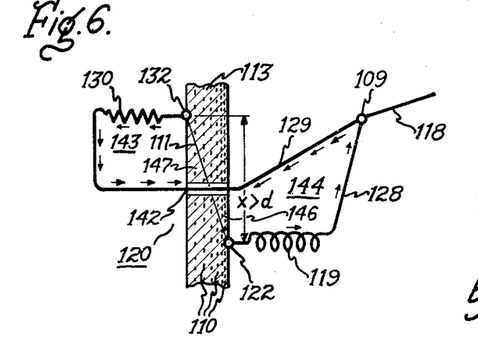
FIG. 6 is a schematic, cross-sectional view of a still another embodiment of the invention.

FIGS. 4–6 illustrate other embodiments of the invention. In FIGS. 4–6, the coils 119 represent a heater coil such as 19 and 19' in FIGS. 1–3, the resistances 130 represent the resistance means 30 and 30', and the lead 118 represents a lead from a current transformer such as 18 in FIG. 1; the connecting leads 128 and 129 respectively represent leads 28 and 29 in FIGS. 1–3. For the purpose of simplification, the resistance 130 is assumed to be grounded at the point 132 at which it touches the wall 113. The wall 113 represents an electrical apparatus enclosure tank wall made from magnetic conducting material, such as 13 in FIGS. 1–3. The heater coil 119 is considered grounded at the point 122 at which it touches the wall 113. It is to be assumed that the lead 118 is connected to a current transformer which has as its primary winding a conductor which produces a stray flux that travels through the wall 113 in the same manner as indicated in FIG. 3.

Referring now to FIG. 4, therein is illustrated an embodiment of the invention in which the resistance element 130 and the heater coil 119 of a temperature detecting device 120 are all grounded to the tank wall 113 along a line 140 that is parallel to the flux 110 in the wall. Also, the lead 129 from the resistance 130 to the current transformer lead 118 passes through the tank wall at a point on the line 140. Therefore, the distance $d$ equals zero because none of the elements are spaced from each other in a direction perpendicular to the flux 110. Consequently, the stray flux 110 passing through the tank 113 cannot link the closed loop comprising the elements 119 and 130, the leads 128 and 129, and the conducting path 111 through the tank 113 between the ground points 122 and 132. Thus, the significant feature of this embodiment is that when the circuit elements of the temperature detecting device 120 that define the loop circuit pass through or are attached to the tank wall in a plane that is parallel to the direction of travel of flux 110, essentially none of the flux in the tank wall will be linked. The result is that no significant amount of circulating current will be produced in the loop circuit, and the device 120 can be accurately calibrated.

Referring now to FIG. 5, therein is illustrated another embodiment of the invention in which the resistance means 130 and the heater coil 119 are both grounded at 132 and 122, respectively, in a plane which is parallel to the direction the flux 110 is traveling through the tank wall 113. However, the lead 129 connecting the resistance 130 to the current transformer lead 118 passes through the tank wall at a location 141 spaced either above or below the ground points in a direction perpendicular to the flux 110. Thus the flux 110 in the tank wall 113 between the location 141 and the plane of the ground points 122 and 132 will be linked by a closed loop circuit. Consequently, the distance between the plane containing the ground points and the location 141 must be less than the predetermined distance $d$ that was previously described with respect to FIGS. 1-3. It should also be understood that this condition also applies to the embodiment of FIGS. 1-3 in that the points at which the leads 29 and 29' pass through the wall of tank 13 must be between the ground points 22 and 32, or in other words, within the distance $d$ as illustrated in FIG. 1.

In some situations it may not be possible for the resistance means 130 and heater coil 119 to be grounded within the predetermined distance $d$. In such a situation, there is an arrangement that makes it possible to cancel the effect of the loop current induced by the stray flux 110 in the tank wall 113. Such an arrangement is shown in FIG. 6 where the distance $x$ between the ground 122 for heater coil 119 and the ground 132 for resistance 130 is greater than the predetermined distance $d$. It would be expected that this arrangement would produce a circulating loop current of magnitude sufficient to cause inaccurate indications by the device 120. However, it is possible to bring the lead 129 through the tank wall at a location 142 between the ground points 122 and 132 so as to diminish the net current circulating in the loop circuit to a magnitude that does not affect calibration of the device 120. The reason for this is that when the lead 129 is brought through the tank wall 113 at a point intermediate the ground points, two loops 143 and 144 will be formed so that the loop circuit has a form resembling a figure 8. The currents produced in the loops 143 and 144 by the flux 110 will tend to buck each other. The reason for this is that since the flux 110 travels in only one direction through the tank wall 113, it will produce a current tending to travel, for example, counterclockwise in both of the loops 143 and 144. These currents will meet and oppose each other as indicated by the small arrows in FIG. 6. Therefore, there will be some net current flowing in the overall loop circuit, but the net current will be less than the current produced in either loop 143 or 144. For example, when the flux density throughout the thickness of the tank wall 113 is uniform, the lead 129 could be brought through at a location exactly midway between the ground points 122 and 132. In that situation the circulating currents in both loops 143 and 144 would be equal, and would cancel each other out. However, in commercial electrical apparatus, the uniform flux density condition is almost never encountered. Therefore, the location 142 at which the lead 129 is brought through the tank wall should be closer to the point 122 at which the heater coil 119 is grounded to the inside of the tank wall 113 because the portion 146 of the tank wall that is linked by the loop 144 has a much higher flux density than wall portion 147 that is linked by the loop 143.

From the foregoing embodiments, it will be appreciated that the basic condition upon which my invention is based is that the effect of stray flux concentrated in an enclosure made from magnetic material must be reduced to a magnitude that will not cause significant errors in a condition ascertaining means on the enclosure. Errors are caused by currents of unpredictable magnitude that flow in closed conducting loops defined by circuit elements in the condition ascertaining means that are connected to the enclosure. These currents are induced by flux in the enclosure that links the closed conducting loops. The linkage of flux in the enclosure is brought about because one of the circuit elements is on the inside of the enclosure while the other element is on the outside of the enclosure. Reducing the effect of the flux is accomplished by control of the distance, measured in a direction perpendicular to the direction of travel of the flux, that separates two conductors of the condition ascertaining means that pass through the enclosure. One of the conductors is insulated from the enclosure and the other conductor has been a portion of the enclosure itself in the illustrated embodiments.

Figure 7:
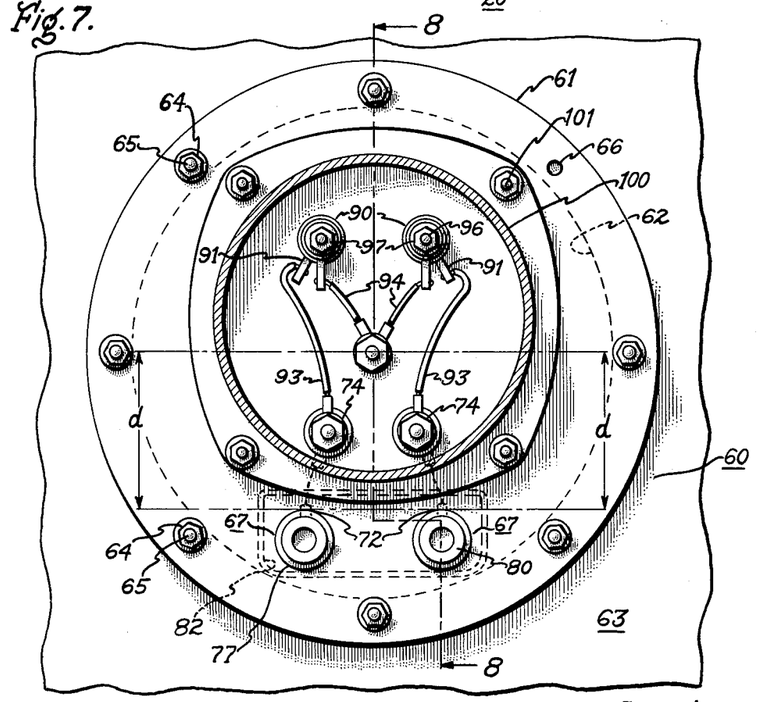
FIG. 7 is an end elevational, partially cross-sectional view of an integral temperature detecting assembly in accord with my invention.
Figure 8:
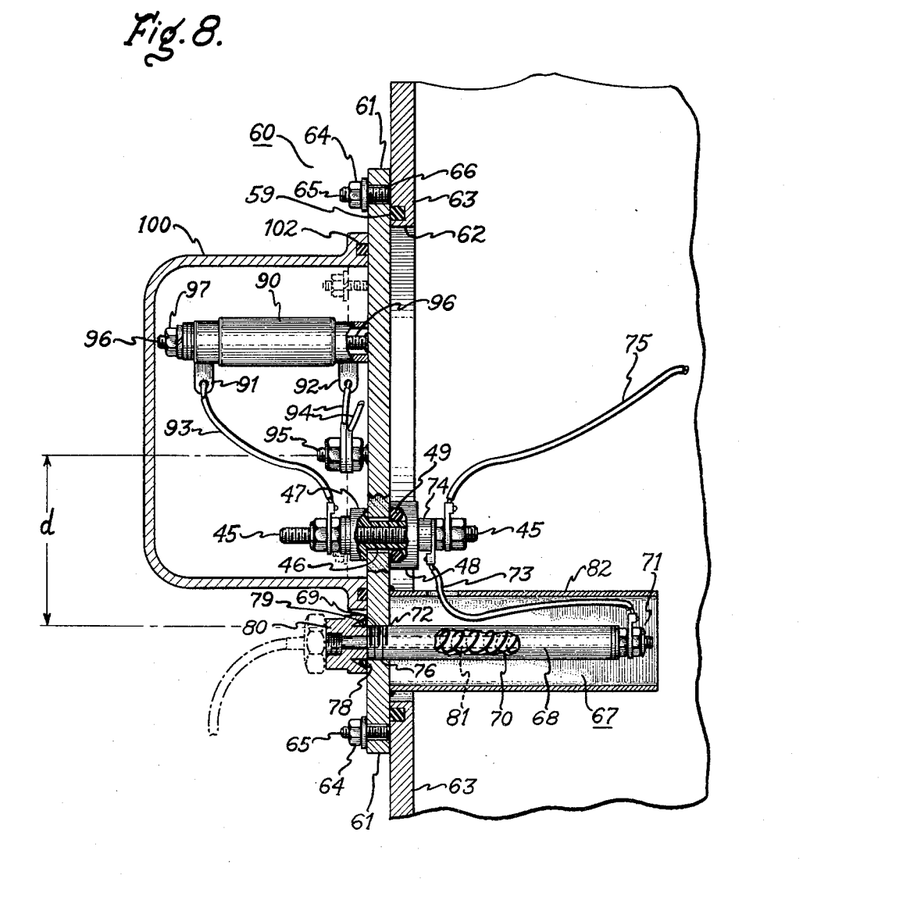
FIG. 8 is a cross-sectional side view taken along the line 8—8 in FIG. 7 with some parts broken away.

Referring now to FIGS. 7 and 8, therein is illustrated an embodiment of an integral temperature detecting assembly 60 employed on commercial electrical transformers which were subject to the previously mentioned difficulties in accurately adjusting temperature detecting devices. The assembly 60 comprises a metal plate 61 that is attachable around an opening 62 of a wall 63 of a metallic enclosure for electrical apparatus, such as is illustrated in FIG. 1. The plate 61 may be removably attached to the wall 63 by suitable means, such as nuts 64 that are threaded on bolts 65 which are secured to the wall 63 by welding. The bolts 65 extend through suitably located apertures 66 in the plate 61. A fluid-tight seal may be maintained around the opening 62 by employing a gasket 59 in a groove around the outside surface of the enclosure tank wall 63. Consequently, the plate 61 can be considered a part of the enclosure tank wall 63.

A plurality of heater well assemblies 67 are removably attached to the plate 61. The heater well assemblies each comprise a metal tube 68 that passes through a tapped hole 69. Each tube 68 has an internally threaded open end 80 exposed at the outside surface of the plate 61, and a closed end extending into the enclosure. The tubes 68 contain heater coils 70 which are connected at one end to a terminal 71, and connected at the other end to a metallic portion of the tube 68 that is grounded to the plate 61 at a point 72 where external threads 76 on well 68 engage internal threads on tapped hole 69. An enlarged shoulder portion 77 may have a slanting groove 78 for retaining a gasket 79 that is compressed against the plate 61 to seal the hole 69. The terminal 71 is connected by a lead 73 to a current transformer connection terminal 74. The connection terminal 74 comprises a threaded stud 45 that passes through an opening 46 in the plate 61. The stud 45 is insulated from the plate 61 by a non-conducting sleeve 47. The opening 46 may be sealed by an element 48 that is recessed to hold a gasket 49. The parts comprising the terminal 74 are held in place by nuts threaded on the ends of the stud 45. The terminal 74 is connected by a lead 75 to one end of the secondary winding of a current transformer in the manner shown and described with reference to FIGS. 1 and 2.

Each heater well 67 is adapted to receive a thermally responsive element 81 (indicated in phantom in FIG. 7) from a device for providing a response such as visible indication of the temperature of a winding. The element 81 may be removably attached by means of external threads that mate with the internal threads in the open end 80 of the tube 68. For example, the element 81 may be a fluid-containing bulb or a resistor that varies with temperature, since the element 81 is in heat transfer relation with the heater coil 70. The thermally responsive element 81 may be associated with means producing a visible indication of temperature in the same fashion as the conventional arrangements described with reference to FIGS. 1 and 2. The specific structure of the element 81 and the manner in which it is associated with a visible indicator form no part of the present invention. The ends of the heater well assemblies 67 that extend into the enclosure tank may be surrounded by an open ended metal box 82 that is secured to the inside of the plate 61. The metal box 82 will thus provide a magnetic shield for the heater well assembly and reduce the heat producing effects of eddy currents in the heater well assembly.

Each heater coil 70 is provided with a calibrating resistor 90. The resistors 90 may be of the type in which a resistance ribbon wire is wound on a hollow cylindrical porcelain core and the ribbon and core are both coated with a thin film of porcelain. This type of resistor can be obtained from the Ohmite Company under catalog No. CODID followed by the proper resistance value. The resistors are removably attached to the plate 61 by telescoping them over threaded studs 96 that are welded to the plate 61 at one end. The resistors 90 are held on the studs 96 by nuts 97 engaging the threads on the studs. This provides an economical arrangement that facilitates changing resistors quickly when the device is being calibrated. The resistors 90 have terminals 91 and 92 at opposite ends thereof. One terminal 91 is connected by a lead 93 to one end of the current transformer connection terminal 74. The other terminal 92 is connected by lead 94 to a stud 95 which serves as a common ground for all resistors 90. The common ground stud 95 is in metal-to-metal contact with the plate 61 because it is welded thereto at one end. The common ground stud 95 for the resistance elements 90 and the points 72 at which the heater coils 70 are grounded to the plate 61 are separated by a pre-determined distance $d$. The resistors 90, terminals 74, ground stud 95, and the leads associated therewith may be enclosed in a metallic dome 100 to protect them from the weather. The dome 100 may be attached to the plate 61 by means of nuts threaded on to the studs 101. The studs 101 are secured to the plate 61 and pass through suitably located holes in the dome 100. A weather tight seal may be obtained by employing a gasket 102 in a groove around the interior periphery of the dome 100.

Comparison of FIGS. 7 and 8 with FIG. 2 will reveal that the respective heater coils and resistance elements are connected in essentially the same circuit arrangement in all three figures. Thus, stray flux from a conductor that acts as the primary winding of the current transformer to which the lead 75 is connected will be linked by closed metal paths. Each closed metal path is defined by a loop consisting of a resistor 90, a lead 93, a terminal 74, a lead 73, a heater coil 70, the portion of the plate 61 between the heater coil ground point 72 and the common ground stud 95, the stud 95, and a lead 94. Thus it is possible for undesirable loop currents to be induced by flux in the plate 61 in the same manner as described previously with reference to FIG. 2. However, in a temperature detecting assembly 60 constructed in accord with my teachings, the distance $d$ between the common ground stud 92 and the points 72 at which the coils 70 are grounded is kept to a dimension small enough to insure that the amount of flux that passes through the plate 61 between the grounds will not induce a loop current sufficiently large to cause significant errors in the calibration of the device. Furthermore, the terminal 74 through which the resistor 90 is connected to the current transformer lead 75 passes through the plate 61 between the ground points at 72 and 95. Consequently, the previously described advantages of the arrangement of FIG. 6 are obtained, since two loops producing currents that buck each other are defined.

In commercial power transformers having a power-carrying capacity of 12,000 kva. and above, it has been determined that when the distance $d$ was in the range of from about twelve to sixteen inches, correspondingly located temperature detecting assemblies comprising heater coils, calibrating resistors, and visible indicating means, showed variations in temperature of from eight to ten degrees centigrade. I have discovered that when the distance $d$ is reduced to about three and one-half inches, the loop currents induced by stray flux in the enclosure are so small that they do not materially affect the calibration of the temperature detecting assemblies, and variations of only one degree or less can be easily obtained for pairs of indicating devices. It should be emphasized that the above-mentioned three and one-half inch distance $d$ is the distance between grounds measured in a direction substantially perpendicular to the direction the flux was traveling in the enclosure; the actual distance between the grounds when measured on a straight line connecting the ground points was roughly four inches. On the basis of what is known about the properties of the materials employed and the strength of the magnetic fields encountered, it is believed that acceptable results can be obtained when the distance $d$ is as much as about six inches. Of course, it will be appreciated by those skilled in the art that the smaller the distance $d$, the more accurate will be the calibration of the device; thus when the grounds for reistors and heater wells coincide, the distance $d$ will be zero and no significant undesirable loop current will be encountered. However, in commercial apparatus it is inconvenient and expensive to insulate these elements from the tank wall and provide them with leads grounded to the same point. The impracticality of such an arrangement is apparent from FIGURE 8 where it can be seen that insulating of tube 68 from the wall 63 would require a threaded insulated bushing in the tapped hole 69, and connection of the tube 68 to the stud 95 would require a lead extending through the dome 100. It is also impractical to ground the resistor 90 to the same point as the temperature detecting device because any lead to the point 72 would have to pass through the dome 100, and such a lead would also interfere with the gasket 79.

The design of the temperature detecting assemblies 60 has been standardized so that when the distance $d$ is about three and one-half inches, these assemblies can be employed on different sized power transformers having power-carrying capacity ratings in the range of from about 12,000 kva. to 300,000 kva. The significant variables that determine the amount of current induced in the tank wall or plate 61 by stray flux have been listed in Table I for transformers employing temperature indicating assemblies 60 having the construction illustrated in FIGS. 7 and 8:

*Table I*

| Transformer kva. Rating | Approximate Low Voltage Bushing Current (amperes) | Approximate Distance from L. V. Bushing to Temperature Detector Grounds (inches) | Tank Wall Material | Approximate Tank Wall Thickness (inches) |
|---|---|---|---|---|
| 12,000 | 800 | 12 | Welding Quality Plate Steel (Permeability about 3,000). | [1] 3/8 |
| 300,000 | 10,000 | 20 | | [2] 7/16 |

[1] From 12,000 kva. to 150,000 kva.
[2] From 150,000 kva. to 300,000 kva.

The values for low voltage bushing current and distance between the low voltage bushing and temperature detector grounds determine the strength of the magnetic field capable of producing the undesirable loop currents. The permeability of the tank wall material and its thickness influence the ability of the flux to concentrate in the tank wall. In an assembly 60, as shown in FIGS. 7 and 8, the plate 61 will have the same thickness and be made from the same material as indicated for the tank wall in Table I. Those skilled in the art will realize the virtual impossibility of calculating the distance $d$ for any given electrical apparatus from the variables listed above. Consequently, it will be realized that the only satisfactory way of determining the distance $d$ with the assurance that the loop currents will not be large enough to cause inaccuracies is by empirical methods.

It has thus been shown that the above described embodiments of my invention possess the advantage that they eliminate the effect of stray flux on condition ascertaining means for electrical apparatus. Therefore, if an inaccuracy is discovered in such devices, the effect of stray flux need not be considered as a possible cause. This permits the immediate investigation of other possible sources of calibration errors, such as a poor electrical connection, a partially grounded lead, or a faulty current transformer.

Another significant advantage of a temperature detecting assembly 60 having the structure shown in FIGS. 7 and 8 is that it can be fabricated by mass production techniques as an integral, standardized, stock part, and then used on different sized transformers in the wide range of power ratings mentioned above. This increases the standardization of large power transformers because they will all have the same sized opening 62 for receiving the assemblies 60 and the bolts 65 for attaching them are located in the same manner. When it is desired to employ a large number of heater wells 67 than in the embodiment illustrated, they can be inexpensively added to an assembly 60 merely by tapping additional holes 69 to thread them into. The calibrating resistors 90 and current transformer connection studs for the newly added heater wells can be easily applied to the plate 61 by attaching them in the manner previously described; the additional resistors 90 and connection studs 74 may be located symmetrically around the common ground stud 95, since ample room is provided under the dome 100. This is a departure from the wasteful and expensive prior art practice wherein heater well assemblies, resistors, ground studs, etc., were attached directly to the tank wall; this practice resulted in a large number of differently arranged layouts for the temperature detecting devices and resulted in each large transformer being more or less tailor-made.

It will be understood, of course, that while the forms of the invention herein shown and described constitute preferred embodiments of the invention, it is not intended herein to illustrate all of the equivalent forms or ramifications thereof. For example, although the transformer in FIG. 1 is illustrated as having the bushing 16 mounted on the top thereof, it will be appreciated that my invention is of equal value when the bushing is mounted on a side of the apparatus. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. Electrical apparatus having in combination, an enclosing tank of a magnetic material in which flows stray magnetic flux from said apparatus when it is in operation, means for indicating externally of said tank an internal operating condition of said apparatus, said means including a pair of electric circuit elements mounted respectively on the inside and the outside of said tank, said circuit elements being interconnected to form a closed loop circuit by means of at least two circuit conductors, at least one of said conductors being insulated from said tank, and both of said conductors passing from the inside to the outside of said tank, the distance between said conductors where they pass from the inside to the outside of said tank measured in a direction substantially perpendicular to said stray flux being sufficiently short that any circulating current induced in said closed loop circuit by linkage with said flux will be reduced below a magnitude that produces significant errors in said indicating means.

2. Electrical apparatus having in combination, an enclosing tank of a magnetic conducting material in which flows stray magnetic flux from said apparatus when it is in operation, means for indicating externally of said tank an internal operating condition of said apparatus, said means including a pair of electric circuit elements mounted respectively on the inside and the outside of said tank, said circuit elements being interconnected to form a closed loop circuit by means of two circuit conductors which pass from the inside to the outside of said tank, one of said conductors being insulated from said tank, the other of said conductors being a conducting portion of said tank, the distance between said conductors where they pass from the inside to the outside of said tank measured in a direction substantially perpendicular to said stray flux being sufficiently short that any circulating current induced in said closed loop circuit by linkage with said flux will be reduced below a magnitude that produces significant errors in said indicating means.

3. In electrical apparatus of the type having a current-carrying member contained in an enclosure of metallic magnetic material, and said apparatus having a power carrying capacity sufficiently large to cause stray flux produced by current in said member to be concentrated in said enclosure, the improvement in means for electrically determining the temperature of said current-carrying member comprising, means providing a current proportional to the current in said member, temperature detecting means electrically connected at one end to the means providing a proportional current and grounded to said enclosure at its other end, calibrating resistance means connected to said means providing proportional current in shunt with said temperature detecting means through a separate ground connection on said enclosure, said grounds being a predetermined distance from each other, whereby said temperature detecting means and said calibrating resistance means are interconnected through said enclosure in a closed loop circuit that is linked by stray flux in said enclosure, and said predetermined distance being such that current induced in closed loop by said stray flux is reduced to a magnitude that permits accurate calibration of the temperature determining means.

4. The invention recited in claim 3 in which said electrical apparatus is a power transformer having a power-carrying capacity above about 10,000 kva., and said predetermined distance is from zero to about six inches.

5. The invention recited in claim 3 in which said electrical apparatus is a power transformer having a power-carrying capacity of from about 12,000 kva. to about 300,000 kva., and said predetermined distance is no more than about three and one-half inches.

6. In electrical apparatus of the type having a current-carrying member contained in an enclosure of magnetic conducting material, said apparatus having a power-carrying capacity sufficiently large to cause stray flux produced by current in said member to be concentrated in a portion of a wall of said enclosure, the improvement in means for electrically determining the temperature of said current-carrying member comprising a current transformer associated with said member so as to provide a current proportional to the current in said member, temperature detecting means including a heater coil electrically connected at one end to said current transformer and grounded at its other end to said wall portion at the inside of said enclosure, calibrating resistance means connected to said current transformer in shunt with said heater coil through a connection grounded separately to said wall portion on the outside of said enclosure, said grounds being a predetermined distance from each other, whereby said heater coil and said resistance means are interconnected through said wall portion in a closed loop circuit that is linked by stray flux concentrated in said tank wall, and said predetermined distance being such that current induced in said loop circuit by said stray flux is reduced to a magnitude that permits accurate calibration of said temperature determining means.

7. In electrical apparatus of the type having a current-carrying member enclosed in a dielectric liquid-containing tank made of metallic magnetic material, and said apparatus having a power-carrying capacity sufficiently large to cause stray flux produced by current in said member to be concentrated in a portion of a wall of said tank, the improvement in means for electrically determining the temperature of said current-carrying member comprising a current transformer secondary winding around a lead from said member for providing a current proportional to the current in said member, temperature detecting means including a heater coil electrically connected at one end in series with said current transformer secondary winding and grounded at its other end to said wall portion at the inside of said tank, said heater coil extending through an opening in said wall portion so as to be immersed in the liquid in said tank, calibrating resistance means supported on the outside of said tank, said resistance means being connected to the current transformer secondary winding in shunt with said heater coil through a separate ground connection on said wall portion, said heater coil and said resistance means being connected to said secondary winding by means of a common connection terminal that extends on both sides of but is insulated from said wall portion, said grounds being a predetermined distance from each other, whereby said heater coil and said resistance means are interconnected through said wall portion in a closed loop circuit that is linked by stray flux concentrated in said tank wall, and said predetermined distance being such that current induced in said closed loop by said stray flux is reduced to a magnitude that permits accurate calibration of said temperature determining means.

8. In electrical apparatus of the type having a current-carrying member contained in an enclosure of metallic magnetic material, and said apparatus having a power carrying capacity sufficiently large to cause stray flux produced by current in said member to be concentrated in said enclosure, the improvement in means for electrically determining the temperature of said current-carrying member comprising, means providing a current proportional to the current in said member, temperature detecting means electrically connected at one end to the means providing a proportional current and grounded to the inside of said enclosure at its other end, calibrating resistance means connected to said means providing proportional current by an insulated lead that passes through said enclosure, said resistance means being connected in shunt with said temperature detecting means through a separate ground connection on the outside of said enclosure, said grounds being spaced from each other in a direction substantially perpendicular to said flux, said insulated lead passing through said enclosure between said grounds at a point located a predetermined distance from each ground, whereby said temperature detecting means and said calibrating resistance means are interconnected through said enclosure in a closed circuit defining two loops that are linked by stray flux in said enclosure and the current induced in one of said loops by said flux is in the opposite direction to the current induced in the other loop, and said predetermined distance being such that the net current flowing in said closed loops is reduced to a magnitude that permits accurate calibration of the temperature determining means.

9. In electrical apparatus of the type having a current-carrying member contained in an enclosure of metallic magnetic material, and said apparatus having a power carrying capacity sufficiently large to cause stray flux produced by current in said member to be concentrated in said enclosure, the improvement in means for electrically determining the temperature of said current-carrying member comprising, means providing a current proportional to the current in said member, temperature detecting means electrically connected at one end to the means providing a proportional current and grounded to the inside of said enclosure at its other end, calibrating resistance means connected to said means providing proportional current by an insulated lead that passes through said enclosure, said resistance means being connected in shunt with said temperature detecting means through a separate ground connection on the outside of said enclosure, said grounds being substantially aligned with each other in a direction perpendicular to said flux, but the location where said insulated lead passes through said tank being a predetermined distance from the aligned grounds, whereby said temperature detecting means and said calibrating resistance means are interconnected through said enclosure in a closed loop circuit that is linked by stray flux in said enclosure, and said predetermined distance being such that current induced in said closed loop by said stray flux is reduced to a magnitude that permits accurate calibration of the temperature determining means.

10. In electrical apparatus of the type having a current-carrying member contained in an enclosure of metallic magnetic material, and said apparatus having a power carrying capacity sufficiently large to cause stray flux produced by current in said member to be concentrated in said enclosure, the improvement in means for electrically determining the temperature of said current-carrying member comprising, means providing a current proportional to the current in said member, temperature detecting means electrically connected at one end to the means providing a proportional current and grounded to the inside of said enclosure at its other end, calibrating resistance means connected to said means providing a proportional current by an insulated lead that passes through said enclosure, said resistance means being connected in shunt with said temperature detecting means through a separate ground connection on the outside of said enclosure, and said grounds and said lead being substantially aligned with each other in a plane parallel to said flux, whereby said temperature detecting means and said calibrating resistance means are interconnected through said enclosure in a closed loop circuit, but said closed loop circuit is oriented so that stray flux in said enclosure is prevented from linking same.

11. A system for simultaneously providing both remote and local indication of the temperature of electrical apparatus of the type having a current-carrying member contained in an enclosure of magnetic conducting material, and said apparatus having a power carrying capacity sufficiently large to cause stray flux produced by current in said member to be concentrated in said enclosure, said system comprising means providing a current proportional to the current in said member, a pair of current actuated temperature detecting means each of which is electrically connected at one end in series with the means providing a proportional current and each of which is grounded at its other end to said enclosure, calibrating resistance means for each temperature detecting means, each resistance means being connected to said means providing proportional current in shunt with its associated temperature detecting means through a separate ground connection on said enclosure, the grounds for each respective temperature detecting means and its associated resistance means being a predetermined distance from each other, whereby each temperature detecting means and its associated calibrating resistance means are interconnected through said enclosure in a closed loop circuit that is linked by stray flux in said enclosure, said predetermined distance being such that current induced in said closed loop by said stray flux is reduced to a magnitude that permits accurate calibration of said temperature detecting means, one of said temperature detecting means being connected to means providing an indication of the temperature of said apparatus locally of the apparatus, and the other of said temperature detecting means being connected to means providing an indication of the temperature of said apparatus at a location remote from the apparatus.

12. For use with means that provides a current proportional to the current in a magnetic flux producing conductor, an integral assembly for detecting the temperature of said conductor comprising a metallic base plate of magnetic material, a metallic heater well having a sealed end and an open end, said well extending through an opening in said base plate and being in metal-to-metal contact therewith, a heater coil in said well, said coil having a terminal at one end extending externally of said well and having its other end connected to said well so as to be grounded to said base plate at a predetermined point, said well being adapted to receive through its open end temperature indicating means having an element responsive to heat generated by said coil, resistance means for calibrating said coil, said resistance means having a pair of terminals, a metallic ground stud attached in metal-to-metal contact with said base plate, a common connection terminal passing through an opening in said base plate so as to provide contacts on each side of said base plate, one terminal of said resistance means being connected to said common connection terminal on one side of said base plate, the other terminal of said resistance means being connected to said ground stud, the external terminal of said heater coil being connected to said common connection terminal on the side opposite said resistance means, said common connection terminal being connectable to the means providing a current proportional to the current in said conductor, and said ground stud and the point at which said heater coil is grounded to said base plate being sufficiently close together that any curent induced in said assembly by magnetic flux from said conductor will have a magnitude sufficiently small to permit accurate calibration of the assembly.

13. For use with means that provides a current proportional to the current in a magnetic flux producing conductor, an integral assembly for detecting the temperature of said conductor comprising a rigid base plate made from magnetic conducting material, a tubular metallic heater well having a sealed end and an open end, said well extending through an opening in said base plate and being in metal-to-metal contact therewith adjacent its open end, a heater coil in said well, said coil having a terminal at one end extending externally of said well and having its other end connected to said well so as to be grounded to said base plate at a predetermined point, said heater well being adapted to receive through its open end temperature indicating means having an element responsive to heat generated by said coil, resistance means for calibrating said coil attached to said base plate, said resistance means having a pair of terminals, a metallic ground stud attached in metal-to-metal contact with said base plate, a common connection terminal passing through an opening in said base plate so as to provide contacts on each side of said base plate, said common connection terminal being insulated from said base plate, one terminal of said resistance means being connected to said common connection terminal on one side of said base plate, the other terminal of said resistance means being connected to said ground stud, the external terminal of said heater coil also being connected to said common connection terminal on the side opposite said resistance means, said common connection terminal being connectable to the means providing a current proportional to the current in said conductor, and said ground stud and the point at which said heater coil is grounded to said base plate being sufficiently close together that any current induced in said assembly by magnetic flux from said conductor will have a magnitude sufficiently small to permit accurate calibration of the assembly.

14. For use with means that provides a current proportional to the current in a magnetic flux producing conductor, an integral assembly for detecting the temperature of said conductor comprising a rigid metallic base plate of magnetic material, a tubular metallic heater well having a sealed end and an open end, said well having external threads adjacent its open end, said threads mating with threads in an opening in said base plate, a spiral heater coil in said well, said coil having a terminal at one end extending externally of said well and having its other end connected to said well so as to be grounded to said base plate at a predetermined point, said heater well being adapted to receive through its open end temperature indicating means having an element responsive to heat generated by said coil, a hollow cylindrical resistor for calibrating said coil, a threaded stud attached to said base plate at one end, said hollow resistor telescoping said stud and being attached thereto by a nut engaging threads on said stud, said resistor having a pair of terminals, a metallic ground stud welded to said base plate, a common connection terminal passing through an opening in said base plate so as to provide contacts on each side of said base plate, said common connection terminal being insulated from said base plate by a sleeve of non-conducting material, one terminal of said resistor being connected to said common connection terminal on one side of said base plate, the other terminal of said resistor being connected to said ground stud, the external terminal of said heater coil being connected to said common connection terminal on the side opposite said resistor, said common connection terminal being connectable to the means providing a current proportional to the current in said conductor, and said ground stud and the point at which said heater coil is grounded to said base plate being sufficiently close together that current induced in said assembly by magnetic flux from said conductor will have a magnitude sufficiently small to permit accurate calibration of the assembly.

15. An integral assembly for detecting the temperature of a magnetic flux producing conductor comprising a rigid base plate of conducting magnetic material, a tubular metallic heater well having a sealed end and an open end, said well being threaded into a tapped hole in said base plate adjacent its open end, a heater coil in said well, said coil having a terminal at one end extending externally of said well and having its other end connected to said well so as to be grounded to said base plate at a predetermined point, said heater well being adapted to receive through its open end temperature indicating means having an element responsive to heat generated by said coil, a resistor for calibrating said coil, said resistor being removably mounted on a stud attached to said base plate, said resistor having a pair of terminals, a metallic ground stud attached in metal-to-metal contact with said base plate, a threaded stud passing through an opening in said base plate so as to provide terminals on each side of said base plate, the last mentioned stud being insulated from said base plate, one terminal of said resistor being connected to said last mentioned stud on one side of said base plate, the other terminal of said resistor being connected to said ground stud, the external terminal of said heater coil also being connected to said last mentioned stud on the side opposite said resistor, said last mentioned stud being connectable to means that provides a current proportional to the current in said conductor, said ground stud and the point at which said heater coil is grounded to said base plate being sufficiently close together that current induced in said assembly by magnetic flux from said conductor will have a magnitude sufficiently small to permit accurate calibration of the assembly, and a protecting dome attached to said plate enclosing said resistor, said last mentioned stud, and said ground stud.

16. An integral assembly for detecting the temperature of a magnetic flux producing conductor comprising a rigid base plate made of metallic magnetic material, a plurality of tubular metallic heater wells each having a sealed end and an open end, said wells extending through openings in said base plate and being in metal-to-metal contact therewith adjacent their open ends, a heater coil in each well, each coil having a terminal at one end extending externally of its well and having its other end connected to its well so as to be grounded to said base plate at a predetermined point, each heater well being adapted to receive through its open end temperature indicating means having an element responsive to heat generated by said coils, resistance means for calibrating each coil attached to said base plate, each resistance means having a pair of terminals, a metallic ground stud attached in metal-to-metal contact with said base plate, a common connection terminal for each heater coil and its associated resistance means, each common connection terminal passing through an opening in said base plate so as to provide contacts on each side of said base plate, said common connection terminals being insulated from said base plate, one terminal of each resistance means being connected to its common connection terminal on one side of said base plate, the other terminal of each resistance means being connected to said ground stud, the external terminal of each heater coil also being connected to its common connection terminal on the side opposite its associated resistance means, each common connection terminal being connectable to means that provides a current proportional to the current in said conductor, and said ground stud and the point at which each heater coil is grounded to said base plate being sufficiently close together that current induced in said assembly by magnetic flux from said conductor will have a magnitude sufficiently small to permit accurate calibration of the assembly.

17. Electrical apparatus having in combination, an enclosing tank of a magnetic material in which flows stray magnetic flux from said apparatus when it is in operation, means for indicating externally of the tank an internal operating condition of said apparatus, said means including a pair of electric circuit elements mounted respectively on the inside and the outside of said tank, said circuit elements being interconnected to form a loop circuit by means of at least two circuit conductors, at least one of said conductors being insulated from said tank and both of said conductors passing from the inside to the outside of said tank, the relative disposition of said conductors where they pass from the inside to the outside of said tank being such at the net circulating current induced in said loop circuit by linkages with said flux will be less than a predetermined magnitude which produces significant error in said indicating means.

References Cited in the file of this patent
FOREIGN PATENTS

| | | |
|---|---|---|
| 561,918 | Great Britain | June 9, 1944 |
| 655,949 | Great Britain | Aug. 8, 1951 |
| 689,882 | Great Britain | Apr. 8, 1953 |